United States Patent [19]

Sasaki et al.

[11] Patent Number: 4,984,084
[45] Date of Patent: Jan. 8, 1991

[54] VIDEO CAMERA

[75] Inventors: Hidemi Sasaki; Yoshiaki Nakayama; Katsuya Inana; Kozo Kokubun; Kazuhiro Tokuda; Mikio Utsugi, all of Tokyo, Japan

[73] Assignee: Fuji Photo Film Co., Ltd., Kanagawa, Japan

[21] Appl. No.: 574,189

[22] Filed: Aug. 29, 1990

Related U.S. Application Data

[62] Division of Ser. No. 368,731, Jun. 20, 1989.

[30] Foreign Application Priority Data

| Jun. 20, 1988 [JP] | Japan | 63-151975 |
| Jun. 30, 1988 [JP] | Japan | 63-163666 |
| Jul. 4, 1988 [JP] | Japan | 63-167438 |
| Dec. 15, 1988 [JP] | Japan | 63-316774 |

[51] Int. Cl.$^5$ ............................................. H04N 5/30
[52] U.S. Cl. ........................................ 398/209; 358/906; 358/229
[58] Field of Search .............. 358/229, 209, 909, 906; 200/328, 329

[56] References Cited

U.S. PATENT DOCUMENTS

| 4,386,376 | 5/1983 | Takimoto et al. | 358/906 |
| 4,400,743 | 8/1983 | Takimoto et al. | 358/906 |
| 4,695,905 | 9/1987 | Utsugi | 358/906 |
| 4,819,101 | 4/1989 | Lemelson | 358/906 |
| 4,835,621 | 5/1989 | Black | 358/906 |

Primary Examiner—Stephen Brinich
Attorney, Agent, or Firm—Sughrue, Mion, Zinn, Macpeak & Seas

[57] ABSTRACT

A video camera including an under grip which can be removably mount to the bottom portion of a main body of the video camera. In the video camera, on the side of the video camera main body, there is arranged photographing button of a double action type which instructs alternately the start and stop of photographing each time the button is operated and, on the side of the under grip, there is arranged a photographing button of a single action for instructing the start of photographing only while the button is being operated. In accordance with the mounting of the under grip to the video camera main body or in accordance with the electrical connection between the under grip and video camera main body, the start of photographing by the photographing button of a double action type is prohibited and the photographing button of a single action type is used preferentially.

10 Claims, 13 Drawing Sheets

FIG. 8(A) S_A
FIG. 8(B) S_B
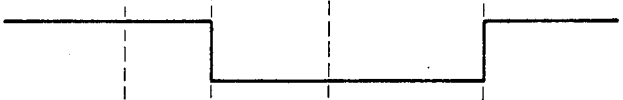
FIG. 8(C) S_C
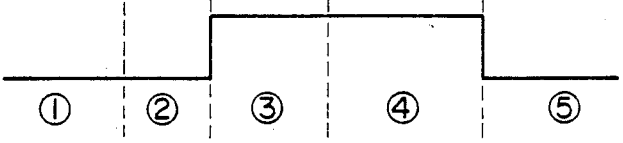
FIG. 8(D) S_D
FIG. 9
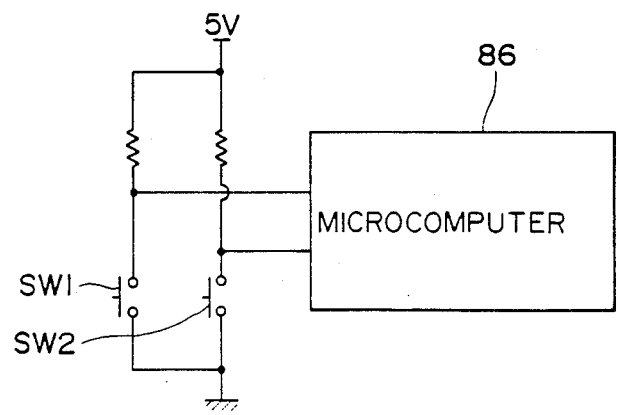

VIDEO CAMERA

This application is a divisional of application Ser. No. 07/368731, filed June 20, 1989.

BACKGROUND OF THE INVENTION

1. Field of the Invention

The present invention relates to a video camera and, in particular, to the improvement of an operation section of a video camera for outputting a start/stop instruction for photographing.

2. Description of the Related Art

In a conventional video camera, the start/stop of photographing is carried out by operating a photographing button disposed in a side grip in the side portion of a main body of the camera. In such photographing button, there is mainly employed a double action system in which the start and stop are instructed alternately every button operation.

On the other hand, in the field of an 8 mm cinecamera, the start and stop of photographing is executed by operating a photographing button arranged in an undergrip disposed in the lower portion of a main body of the cinecamera. In this kind of photographing button, there is mainly employed a single action system in which, while the photographing button is being depressed, photographing is performed and, if a finger depressing the photographing button is released, the photographing is stopped.

The above-mentioned double action type of photographing button is suitable for a long time photographing. However, in this type of photographing button, there are possibilities that, if an operator forgets to push down the button, then the earth may be photographed and that, if the photographing button is depressed in error, then the operator can fail to take an important scene.

On the other hand, the single action type of photographing button has an advantage in that it can prevent failures such as the earth photographing and the like because, if the finger is released from the button, the photographing is stopped. However, this type of photographing button is not suitable for a long time photographing. Also, in the single action type of photographing button, while the operator is holding the grip of the video camera and is moving the video camera, or when the video camera is moved from a photographing position to a position where the camera is to be hung, there is a possibility that the button can be depressed in error instantaneously. In this case, however, even if the photographing button is depressed in error, the photographing can be stopped at once due to its single action system, thereby preventing the failure to photograph the earth for a long time. But, in this type of photographing button, there remains a problem that a short cut is photographed.

SUMMARY OF THE INVENTION

The present invention aims at eliminating the drawbacks found in the above-mentioned conventional video camera.

Accordingly, it is an object of the invention to provide a video camera which has advantages of both of the double action type of photographing button and the single action type of photographing button, can prevent confused operations of the photographing button and can improve the stability in holding.

It is another object of the invention to provide a video camera in which photographing can be started only when a single action type of photographing button is depressed, and, after the photographing is started, even if an operator's finger becomes loose, the photographing cannot be interrupted.

In order to attain the above objects, according to the present invention, there is provided a video camera which comprises: a first photographing button disposed in a main body of the video camera for instructing alternately the start and stop of the photographing each time it is operated; an under grip disposed removably in the bottom portion of the camera main body; a second photographing button disposed in the under grip for instructing the start of the photographing only while the it is in operation; and, means responsive to the mounting of the under grip to the main body of the video camera or to electrical connection of the second photographing button with the main body of the video camera.

According to an aspect of the invention, an under grip can be mounted to the bottom portion of a main body of a video camera and the use of such grip system can improve a stability in holding the video camera and also can eliminate the fear of movement of the hands in taking a picture. Also, since on the side of the video camera main body there is provided a first photographing button of a double action type and in the under grip there is provided a second photographing button of a single action type, the first and second photographing buttons can be used in its proper way according to photographing conditions (for example, photographing while the video camera is placed on a tripod and photographing while the video camera is held by the hands). Also, when the under grip is mounted, the second photographing button in the under grip is used preferentially and the photographing by use of the first photographing button on side of the video camera main body is prohibited, thereby preventing the confused operation of the photographing buttons.

Also, according to another aspect of the invention, in a video camera which is provided with a photographing button used to instruct the start of photographing only during the button operation, after the photographing is started by means of operation of the photographing button, the photographing start instruction can be maintained with a weaker button operation force than the button operation force at the time of start of the photographing.

In other words, according to the invention, there is provided a photographing button of a single action type which is adapted to instruct the start of the photographing only during the button operation. This photographing button is constructed such that the photographing can be started only when the button is operated intentionally, that is, it is operated with a predetermined button operation force. Due to this, the photographing will never be started even if the photographing button is depressed in error instantaneously. Also, once the photographing is started, the start instruction of the photographing can be maintained with a weaker operation force than the button operation force at the time of start of the photographing, so that there is eliminated the possibility that the photographing may be interrupted even if the operator's finger gets loose due to the long photographing.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIGS. 8(A) to (D) are respectively timing charts used to explain the start/stop control part shown in FIG. 7;

FIG. 9 is a block diagram of another embodiment of a photographing start/stop control part according to the invention;

DETAILED DESCRIPTION OF THE INVENTION

Detailed description will hereunder be given of the preferred embodiments of a video camera according to the present invention with reference to the accompanying drawings.

Figure 1:
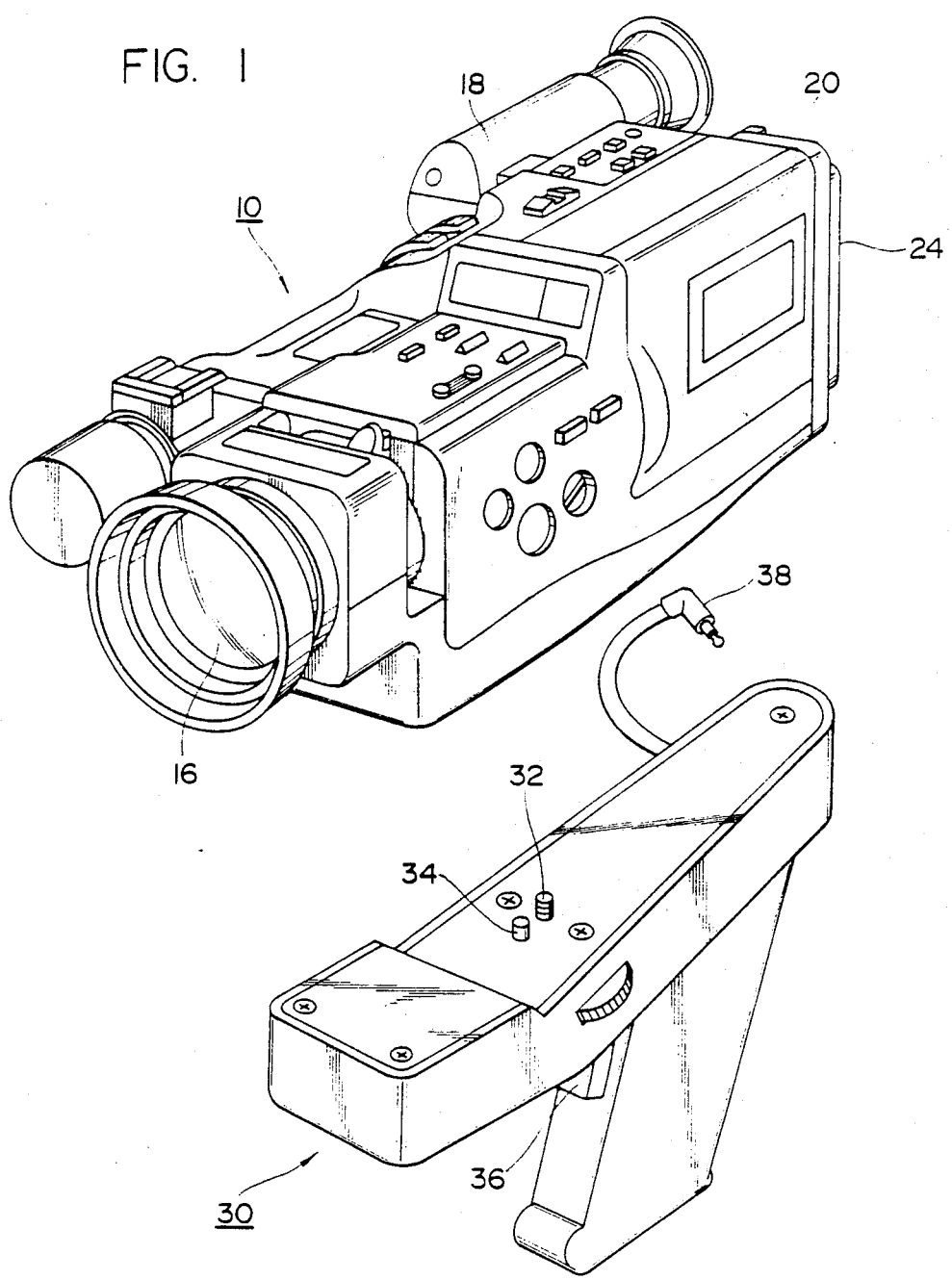
FIG. 1 is a perspective view of an embodiment of a video camera according to the invention.

In FIG. 1, there is shown a perspective view of an embodiment of a video camera according to the invention, in which a main body 10 of the video camera and an under grip 30 are disconnected from each other. Also, in FIG. 2, there is shown a perspective view of the main body 10 of the video camera shown in FIG. 1 when viewed from behind.

Figure 2:
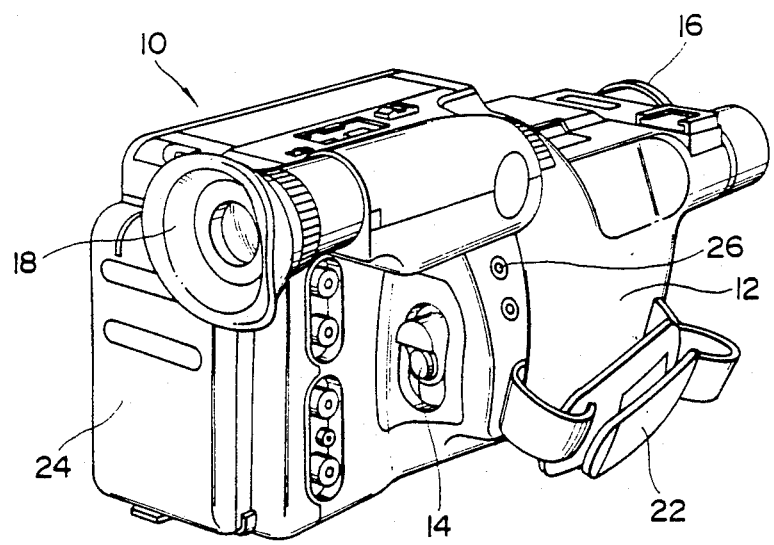
FIG. 2 is a perspective view of the video camera shown in FIG. 1, when viewed from behind.

This video camera is a camera containing VTR (a VTR and a camera are incorporated in one) and, as shown in FIG. 2, on the side portion of the video camera main body 10 there is provided a side grip 12. In the side grip 12, there is arranged a photographing button 14 of a double action type, whereby the photographing start and stop can be repeated alternately each time the photographing button 14 is depressed. In other words, once the photographing button 14 is depressed, even if an operator lets the finger go off from the button, the photographing will continue without interruption and after then, if the photographing button 14 is depressed again, then the photographing is stopped.

In fact, there occurs a period in which no instruction from the photographing button 14 can be accepted due to a joint taking or due to an operation up to stable tape running and, for this reason, accurately, when the photographing button 14 is depressed in a stand-by state or during photographing with the non-accepting period excluded, an operation to move over to a photographing state or to the stand-by state can be initiated. Also, in FIGS. 1 and 2, numeral 16 designates a taking lens; 18 an electronic view finder; 20 a cassette holder; 22 a grip band; and, 24 a battery.

The under grip 30 can be mounted removably to the bottom portion of the video camera main body 10 by means of a mount screw 32 and a projection 34. That is, in order to mount the under grip 30 to the bottom portion of the video camera main body 10, the mount screw 32 is positioned at a tapped hole, which is formed in the bottom portion of the video camera main body 10 for mounting a tripod, the projection 34 is inserted into a recessed portion (not shown) formed in the bottom portion of the video camera main body 10, and then the mount screw 32 is turned and is thereby brought into threaded engagement with the tapped hole for mounting a tripod.

Also, in the under grip 30, there are provided a photographing button 36 of a trigger type, and a cord 38 with a plug 38A for inputting the button operation of the photographing button 36 into the video camera main body 10. And, the plug 38A is inserted into a jack 26 provided on the side grip 12. The photographing button 36, which can be electrically connected with the video camera main body 10 by means of the jack 26, is a photographing button of a single action type. That is, only while the photographing button 36 is being depressed, the photographing can be executed and, if the finger is taken off, then the photographing is stopped. Also, if the plug 38A of the under grip 30 is inserted into a jack 26 of the video camera main body 10, then the photographing button 14 of the video camera main body 10 becomes inoperable and only the photographing button 36 of the under grip 30 can be used.

Figure 3:
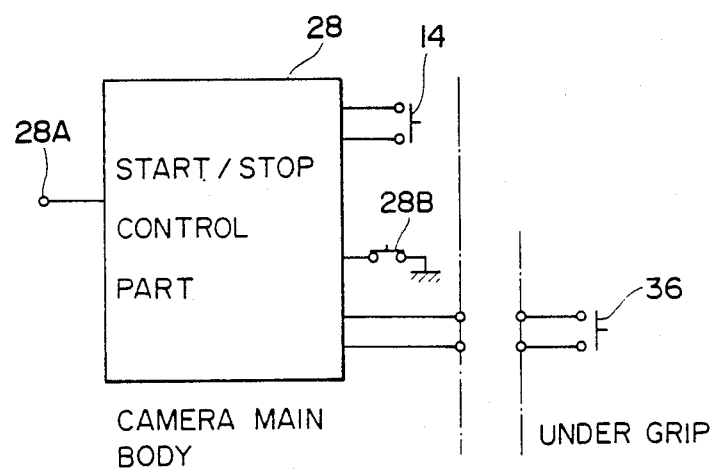
FIG. 3 is a block diagram of a photographing start/stop control part of a main body of the video camera.

In FIG. 3, there is shown a block diagram of a photographing start/stop control part of a video camera according to the present invention. When the video camera main body is not connected electrically with the under grip, the start/stop control part 28 disposed within the video camera main body 10 outputs from its output terminal 28A a signal for instructing the start and stop of photographing each time the photographing button 14 is operated.

On the other hand, if the video camera main body is electrically connected with the under grip, then the electrical connection is detected by detection means (not shown) and, in accordance with the detection output of the detection means, a contact 28B, which allows the photographing button 14 to be operated when closed, is opened. As a result of this, the start of photographing by the photographing button 14 is prohibited. And, the photographing by the photographing button 36 of the under grip 30 becomes possible, so that the start/stop control part 28 is able to output the instruction for start of photographing only while the photographing button 36 is being depressed.

According to the video camera constructed in the above-mentioned manner, for example, when the photographing is executed with the video camera set on a tripod, the video camera main body 10 is fixed onto the tripod and then the double action type of photographing button 14 in the video camera main body 10 is operated, whereby a long photographing can be carried out. Of course, if the under grip 30 is not mounted, similarly as in a conventional video camera, the video camera can be held by use of the side grip 12 for photographing.

On the other hand, when the photographing is carried out with the video camera held by the hands, the under grip 30 is mounted to the video camera main body 10 and then the photographing button 14 in the under grip 30 is operated to thereby perform the photographing. Since the photographing button 14 is a single action type, there is eliminated the possibility of the earth being taken due to the wrong operation of the button. Also, when compared with the side grip, the under grip is improved in stability, there is eliminated the possibility of unintentional movement of the hands in taking a picture, and the under grip is more suitable for the above-mentioned hand-held photographing. In addition, due to the fact that the photographing button 14 is a trigger type button, the photographing can be performed in a sense to pull the "trigger" by use of the forefinger, so that an actually photographing feeling can be provided.

By the way, although in the above-mentioned embodiment the plug is inserted into the jack separately from the mounting of the under grip, the invention is not always limited to this, but the invention can also be contracted such that a connector provided on the side of the video camera main body is automatically connected with a connector provided on the side of the under grip simultaneously when the under grip is mounted to the video camera main body.

Figure 5:
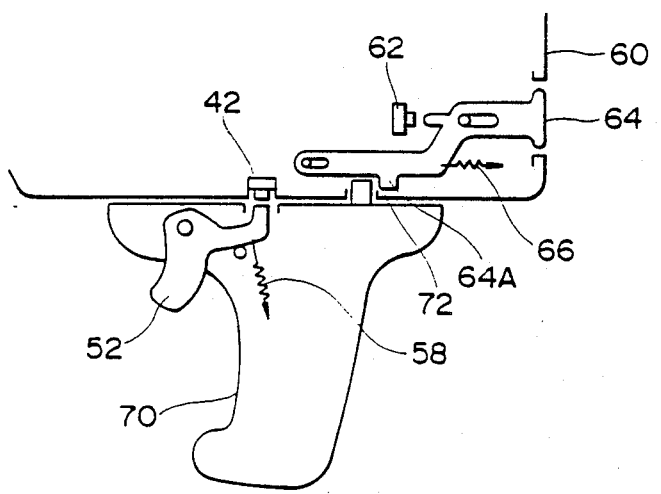

Referring now to FIG. 5, there is shown a schematic view of main portions of a second embodiment of a video camera according to the invention.

In this figure, in the bottom portion of a video camera main body 40, there are provided a photographing switch 42 of a single action type and a grip mounting detection switch 44.

On the other hand, in an under grip 50 which can be mounted to the bottom portion of the video camera main body 40 by means a mount screw 56, there are arranged a photographing button 52 of a trigger type which is used to actuate the photographing switch 42, and a projection 54 which is used to push against the grip mounting detection switch 44.

Figure 4:
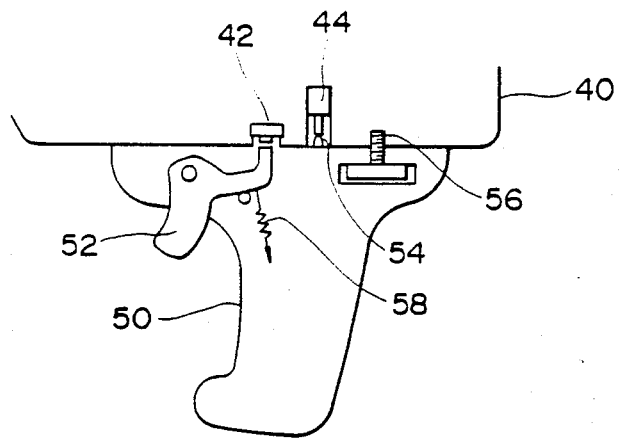
FIGS. 4 and 5 are respectively schematic views of main portions of another embodiments of a video camera according to the invention.

In this structure, as shown in FIG. 4, if the under grip 50 is mounted to the bottom portion of the video camera main body 40, then the grip mounting detection switch 44 is depressed by the projection 54 in the under grip 50. When depressed, the grip mounting detection switch 44 acts to prohibit the start of the photographing by a photographing button (not shown) of a double action type provided on the side of the camera main body 40.

Also, when the under grip 50 is mounted to the bottom portion of the video camera main body 40, then the photographing switch 42 can be operated by the photographing button 52 and, in this state, if the photographing button 52 is pushed against the energizing force of a spring 58, then the photographing switch 42 turns on. In this state, if the finger is taken off from the photographing button 52, then the photographing button 52 is pulled back by the spring 58 to thereby turn off the photographing switch 42.

Referring next to FIG. 5, there is shown a schematic view of main portions of a third embodiment of a video camera according to the invention. In this figure, parts used in common with the embodiment shown in FIG. 4 are given the same designations and the description thereof is omitted here.

Referring to a difference between the second and third embodiments, while in the second embodiment the photographing button on the side of the video camera main body is made inoperable by use of the grip mounting detection switch 44, in the third embodiment the photographing button 64 on the side of the camera main body is locked mechanically in connection with the mounting of the under grip to thereby make it impossible for the photographing button 64 to be operated.

In other words, according to the third embodiment of the invention, in a video camera main body 60, there are provided a double action type of photographing switch 62 and a photographing button 64 for actuating the switch 62, and in this photographing button 64 there is provided a claw portion 64A for locking. On the other hand, in the upper portion of an under grip 70 to be mounted to the bottom portion of the video camera main body 60, there is arranged a lock member 72 for engagement with the above-mentioned locking claw portion 64A.

Therefore, as shown in FIG. 5, if the under grip 70 is mounted to the bottom portion of the video camera main body 60 while the photographing button 64 is returned to its original position by a spring 66, then the claw portion 64A of the photographing button 64 and the lock member 72 of the under grip 70 are brought into engagement with each other to thereby lock the photographing button 64.

According to the video camera constructed in the above-mentioned manner, there can be provided both advantages of a double action of and a single action of photographing buttons, and also, since the single action type of photographing button provided in the under grip is used preferentially when the under grip is mounted to the camera main body, there can be eliminated the possibility of the photographing button being operated in a confused manner. Further, by using the under grip in the hand-held photographing, the holding stability of the video camera can be improved, and there can be eliminated the possibility that the operator's hands may be unintentionally moved in taking a picture, so that an excellent video photographing can be realized.

Next, description will be given of a structure in which, when the start of photographing is instructed by the photographing button 36 once, the instruction for the start of photographing can be maintained with a weaker button operation force than the button operation force at the time of start of photographing.

Figure 6:
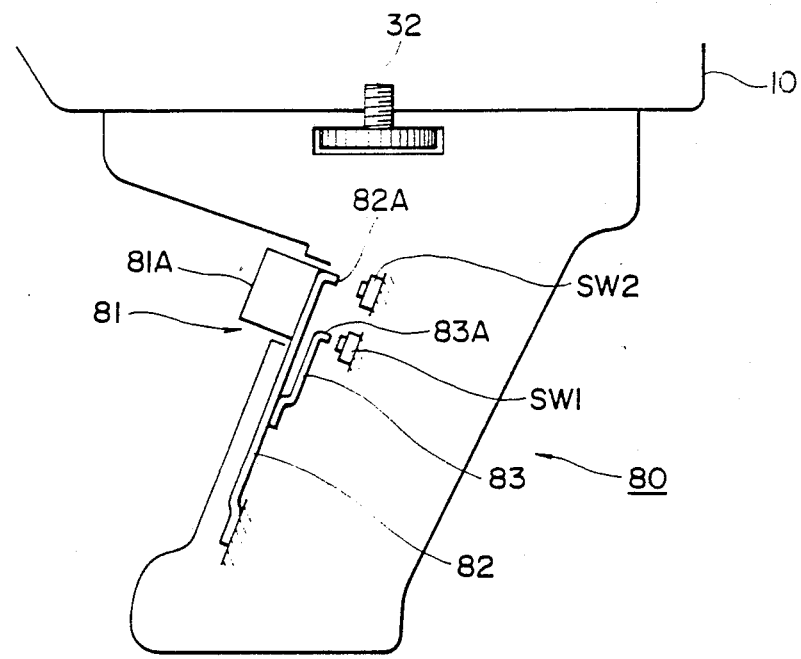
FIG. 6 is a schematic view of main portions of a video camera according to the invention.

In FIG. 6, there is shown a schematic view of main portions of a video camera according to the invention and, in particular, there is shown an under grip 80 which is mounted to the bottom portion of a video camera main body 10 by means of a mount screw 32. As shown in this figure, there is provided a photographing button 81 which has a button operation portion 81A. The button operation portion 81A is disposed on a plate spring 82, so that the button 81 can be operated by a finger when the under grip 80 is gripped by hands. Also, substantially in the central portion of the plate spring 82, there is disposed a plate spring 83 which is used to turn on/off a switch SW1. On the other hand, within the under grip, there are fixedly disposed the switch SW1 and a switch SW2 such that they are opposed to the leading ends 83A and 82A of the above mentioned plate springs 83 and 82, respectively.

In the above-mentioned structure, in operation, if the button operation portion 81A of the photographing button 81 is depressed from its state shown in FIG. 6, then at first the switch SW1 is turned on by the leading end 83A of the plate spring 83 and after then, if the button operation portion 81A is depressed further, then the switch SW2 is turned on by the leading end 82A of the plate spring 82. Also, while the switches SW1 and SW2 are both on, if the finger is taken off from the button operation portion 81A, then the button operation 81A is returned to its original position by means of the plate spring 82, with the result that the switch SW1 is firstly turned off and the switch SW2 is next turned off. In other words, the switch SW1 can be turned on even if the button operation portion 81A is pushed with a weak operation force, but, in order to turn on the switch SW2, the button operation portion 81A must be pushed with a strong force (or, the button operation portion 81A must be pushed deeply).

Next, description will be given below of a start/stop control part which generates the start/stop instructions for photographing by means of the on/off operations of the above-mentioned switches SW1 and SW2.

Figure 7:
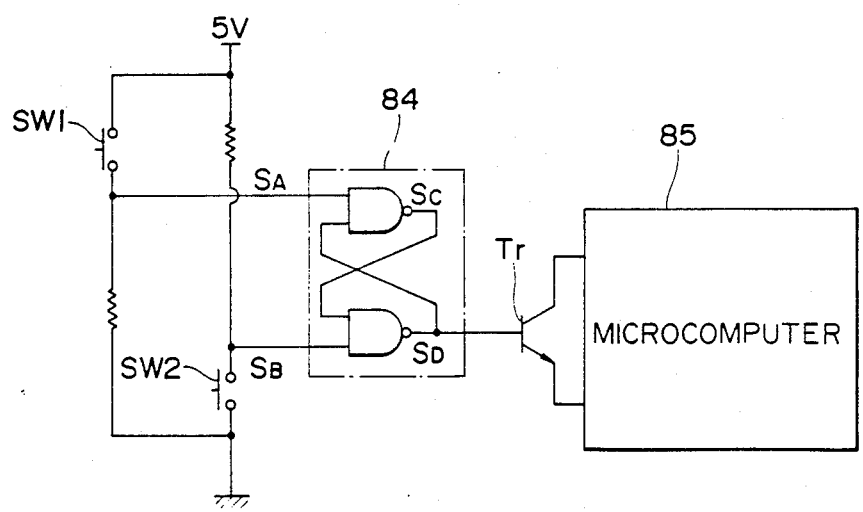
FIG. 7 is a block diagram of an embodiment of a photographing start/stop control part according to the invention.

In FIG. 7, there is shown a block diagram of an embodiment of a start/stop control part according to the invention, which comprises switches SW1, SW2, a flipflop 84, a microcomputer 85 and the like. As shown in this figure, if the input and output signals of the flipflop 84 are designated by $S_A$, $S_B$, $S_C$, and $S_D$, respectively, then the signal $S_A$ goes to a low (L) level when the switch SW1 is off, and the signal $S_A$ goes to a high (H) level when the switch $S_A$ is on. In contrast with this, when the switch SW2 is off, then the signal $S_B$ goes to the H level, and when the switch SW2 is on, then the signal $S_B$ goes to the L level.

Accordingly, the relationships between the ons and offs of the switches SW1, SW2 and the signals $S_A$ through $S_D$ can be shown in the following table (Table 1).

TABLE 1

|   | SW1 | SW2 | $S_A$ | $S_B$ | $S_C$ | $S_D$ |
|---|-----|-----|-------|-------|-------|-------|
| 1 | OFF | OFF | L | H | H | L |
| 2 | ON  | OFF | H | H | H | L |
| 3 | ON  | ON  | H | L | L | H |
| 4 | ON  | OFF | H | H | L | H |
| 5 | OFF | OFF | L | H | H | L |

Also, the timing chart of the signals $S_A$ through $S_D$ in Table 1 can be shown as in FIGS. 8(A) to 8(D). In other words, in Table 1 and FIG. 8, (1) shows a state in which the button operation portion 81A of the photographing button 81 is not depressed; (2) shows a state in which the button operation portion 81A is pushed half or partly from the state of (1) and only the switch SW1 is on; (3) shows a state in which the button operation portion 81A is pushed fully deeply and the switches SW1 and SW2 are both on; (4) shows a state in which the button operation portion 81A is returned half and only the switch SW1 is on; and, (5) shows a state in which the finger is taken completely off from the button operation portion 81A, that is, it is similar to the state of (1).

As can be understood clearly from Table 1 and FIG. 8(D), the signal $S_D$ rises into the H level under the condition that the switch SW2 turns on and the signal $S_B$ goes to the L level and after then it falls into the L level under the condition that both of the switches SW1 and SW2 turn off, the signal $S_A$ goes to the L level, and the signal $S_B$ goes to the H level.

When the output signal $S_D$ of the flipflop 84 is in the L level, then a transistor $T_r$ turns off and the microcomputer 85 instructs the stop of photographing, and, on the other hand, when the signal $S_D$ is in the H level, then the transistor $T_r$ turns on and the microcomputer 85 instructs the start of photographing.

In this manner, if the button operation portion 81A of the photographing button 81 is depressed fully deeply to thereby turn on the switch SW2, then the photographing start instruction is issued and, after then, even if the button operation force of the button operation portion 81A is reduced to thereby turn off the switch SW2, then the photographing state can be maintained. And, if the finger is taken off from the button operation portion 81A to thereby turn off the switch SW1 as well, then the photographing stop instruction is given.

Further, the flipflop 84, microcomputer 85 and the like are contained in the under grip 80 and power is supplied from the side of the video camera main body 10. In addition, the microcomputer 85, responsive to the electrical connection of the video camera main body 10 with the under grip 80, also outputs a signal to prohibit the operation of the photographing button provided on the side of the video camera main body 10.

In FIG. 9, there is shown a block diagram of another embodiment of a start/stop control part according to the invention, in which, when the switches SW1 and SW2 are turned on, then a signal of an H level is output to a microcomputer 86. And, the microcomputer 86, as in the above-mentioned embodiment, responsive to the on/off operations of the switches SW1 and SW2, executes a predetermined processing to thereby generate the start/stop instructions for photographing.

Figure 10:
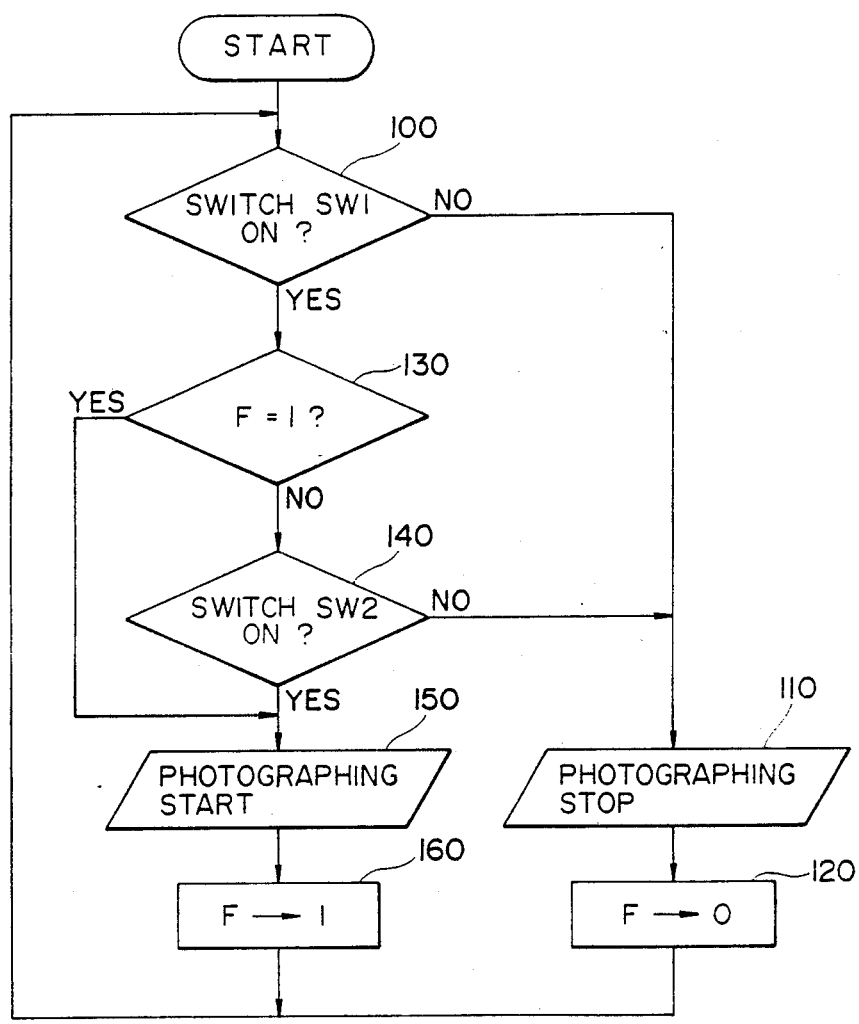
FIG. 10 is a flow chart used to explain the contents to be processed by a microcomputer shown in FIG. 9.

Next, description will be given below of the contents of the processings to be performed by the microcomputer 86 with reference to a flow chart shown in FIG. 10.

In this figure, at first, it is checked whether the switch SW1 is on or not (Step 100). If the switch SW1 is off, then a photographing stop instruction is given (Step 110) and also a flag F, which is used to show whether photographing is under way or not, is set to 0 (Step 120). If the flag F is 1, then it is indicated that the photographing is under way, while, if the flag F is 0, then it is indicated that the photographing is stopped.

Now, if the switch SW1 is on, then the program advances to Step 130, in which whether the flag F is 1 or not is checked. If the flag F is 0 (indicating the stopping of photographing), then the program moves to Step 140, in which whether the switch SW2 is on or not is checked. If the switch SW2 is off, then, similarly as in the above-mentioned case, the program moves back its initial state through Steps 110 and 120. On the other hand, if the switch SW2 is on, then a photographing start instruction is given (Step 150) and also the flag F is set to 1 (Step 160).

After then, when the switch SW1 turns on and also the flag F is 1 (indicating that the photographing is under way), then the program advances from Step 130 to Step 150, in which the photographing is continued whether the switch SW2 is on or off.

And, if the finger is taken off from the button operation portion 81A of the photographing button 81 to thereby turn off the switch SW1, then the program advances again to Step 110, in which the stop of the photographing is instructed.

In either of the above-mentioned embodiments, the instructions for start/stop of photographing are given hysteresis in an electrical manner in accordance with the on/off operations of the switches SW1, SW2. However, the invention is not always limited to this, but, alternatively, hysteresis may be offered to the photographing start/stop instructions by mechanical means.

Figure 11:
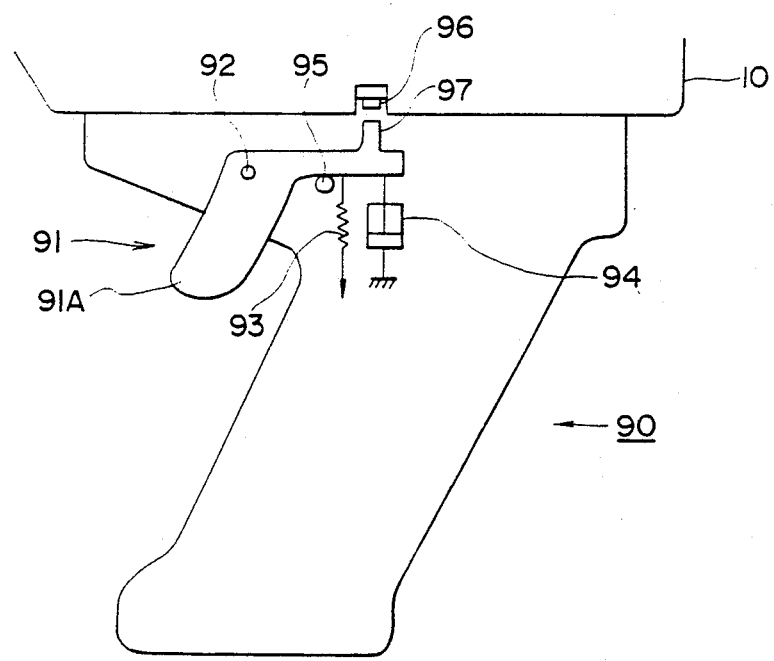
FIG. 11 is a schematic view of main portions of a further embodiment of a video camera according to the invention.

Now, referring to FIG. 11, there is shown a schematic view of main portions of a further embodiment of a video camera in accordance with the present invention. In this figure, a button operation portion 91A of a photographing button 91 is disposed in an under grip 90 such that it is free to rotate about a support shaft 92, and, between the button operation portion 91A and the under grip 90, there are interposed a spring 93 for return and a damper 94. In this figure, numeral 95 designates a stopper which is used to restrict the clockwise rotational movement of the button operation portion 91A. Also, the damper 94 is adapted such that it is effective only when the button operation portion 91A is rotated in a counter-clockwise direction.

On the other hand, in the bottom portion of the video camera main body 10, there is disposed a photographing start/stop switch 96 of a single action type in such a manner that it is opposed to a pressure portion 97 of the button operation portion 91A.

In the above-mentioned structure, if the button operation portion 91A of the photographing button 91 is pushed with a strong force against the spring 93 and damper 94, then the pressure portion 97 of the button operation portion 91A causes a switch to turn on, whereby a photographing start instruction is given. Also, after the photographing start is instructed once, the operator has only to continue to push the button operation portion 91A against the energizing force of the spring 93. Therefore, by decreasing the spring constant of the spring 93, it is possible to prevent the fatigue of the finger even if the photographing is executed for a long time. Also, if the finger is taken off from the button operation portion 91A to thereby make the damper 94 inoperable, then the button operation portion 91A is returned at once by the spring 93 to its original position (a position shown in FIG. 11) to thereby turn the switch 96 off, so that the photographing stop instruction is given.

According to the above-mentioned structure, in particular, while the video camera is being moved with the under grip 90 being held by the hand, if the button operation portion 91A of the photographing button 91 is pushed in error in an instant, then the above-mentioned damper 94 is put into operation to thereby prevent the rotational movement of the button operation portion 91A (start of photographing).

Although in the present embodiment description has been given of the video camera in which the under grip 90 is mounted to the bottom portion of the video camera main body 10, this is not always limitative, but the present invention can also apply to a video camera which has a side grip only. That is, the invention can apply to any video camera, provided that it is provided with a photographing button of a single action type.

Also, according to the above-mentioned video camera, the photographing button of a single action type is constructed such that the photographing can be started only when the photographing button is operated intentionally, that is, only when the button is operated with a predetermined button operation force, so that a short cut will never be taken even if the photographing button is instantaneously pushed in error. And, when the photographing is started once, the photographing start instruction can be maintained with a weaker button operation force than the button operation force at the time of start of the photographing, so that the photographing will never be interrupted even if the finger becomes loose during a long time photographing.

Next, description will be given below of another embodiment of an under grip which is provided in the above-mentioned video camera according to the present invention.

Figure 12:
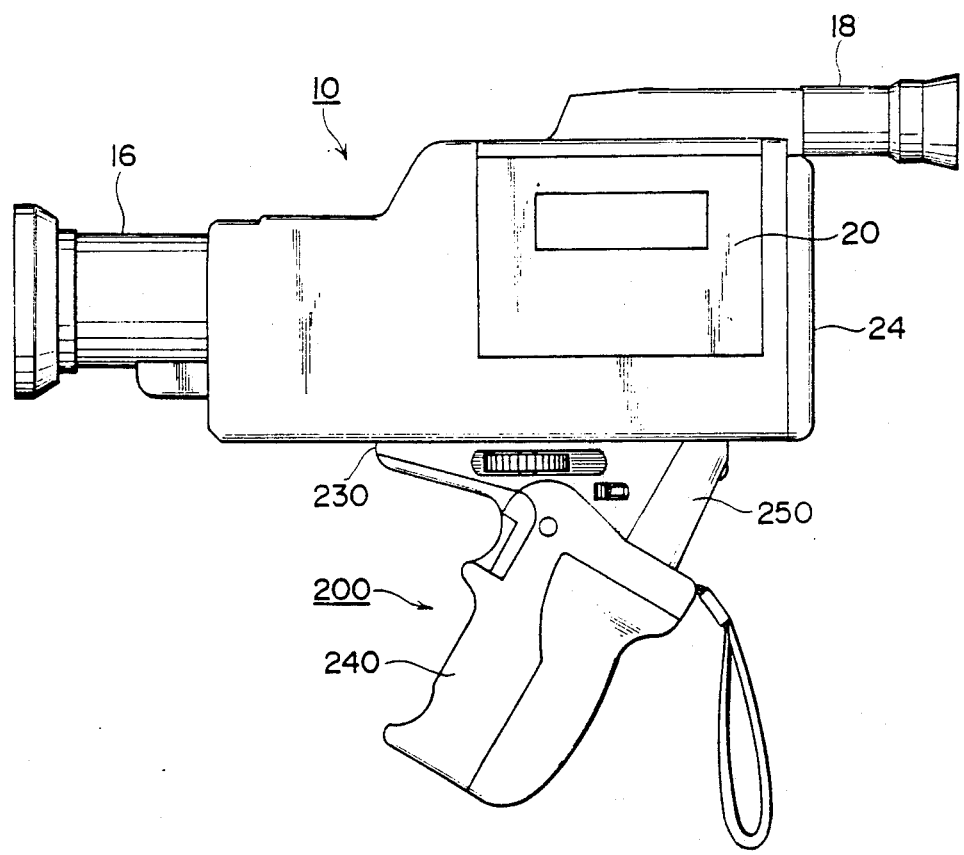
FIG. 12 is a side view of a video camera according to the invention, which is provided with a grip having a tripod function.

In FIG. 12, there is shown a side view of a video camera according to the invention. In this video camera, there is arranged an under grip (which is referred to as a tripod containing grip herein after) 200 having a tripod function. In this figure, the parts thereof used in common with the embodiment shown in FIG. 1 are given the same designations and the description thereof is omitted here.

Figure 13:
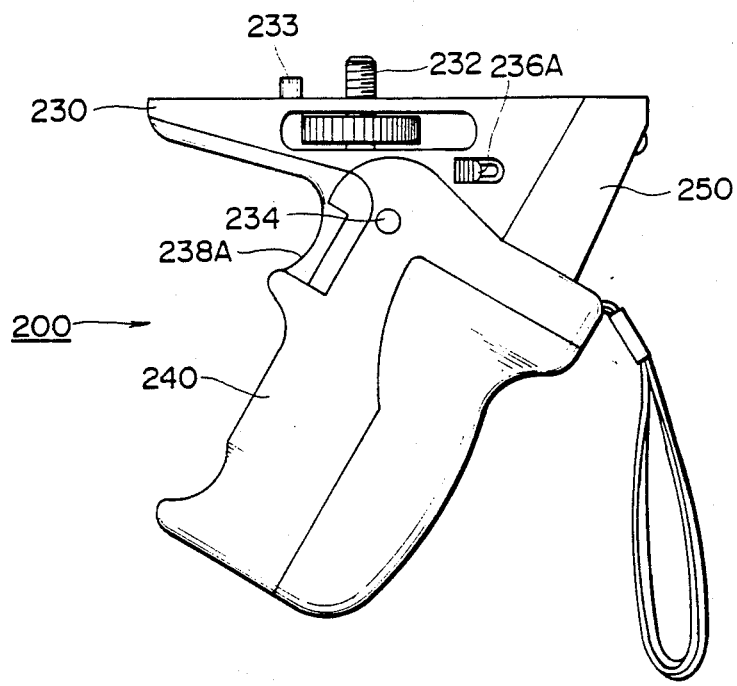
FIG. 13 is a side view of the grip having a tripod function shown in FIG. 12, when it is used.

As shown in FIG. 13, the tripod containing grip 200 is constructed such that it can be removably mounted to the bottom portion of the above-mentioned video camera 10 by means of a tripod screw 232 and a positioning pin 233. In other words, in order to mount the tripod containing grip 200 to the bottom portion of the video camera 10, the tripod screw 232 is positioned in a tapped hole formed in the bottom portion of the video camera 10 for mounting of a tripod, the positioning pin 233 is inserted into a recessed portion (not shown) formed in the bottom portion of the video camera 10 for prevention of rotation, and then the tripod screw 232 is turned and is thereby brought into threaded engagement with the tripod mounting tapped hole.

The tripod containing grip 200 is mainly composed of a grip base portion 230 which is fixed to the bottom portion of the video camera, a grip main body 240 which is actually held by the operator's hands, and a pair of leg portions 250, 250 which serve as right and left leg portions when the tripod containing grip 200 is used as a tripod.

In the grip base portion 230, in addition to the above-mentioned tripod screw 232 and positioning pin 233 there are provided an angular lock mechanism 236 for the grip main body 240 which can be freely rotated via support shaft 234, and a photographing button mechanism 238.

Figure 14:
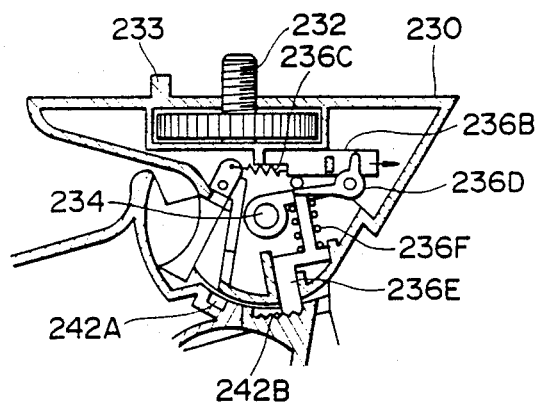
FIG. 14 is a section view, in part, of the above-mentioned tripod containing grip, which is used to explain an angular locking mechanism.

The angular lock mechanism 236, as shown in FIG. 14, comprises a slide member 236B operable together with a lock removing knob 236A (shown in FIG. 13), a spring 236C for returning the slide member 236B, a lever 236D, a claw portion 236E, a spring 236F for energizing the claw portion 236E in the projecting direction thereof, and a recessed portion 242A and a saw-tooth-like portion 242B respectively provided on the side of the grip main body 240 and engageable with the above-mentioned claw portion 236E.

In the above-mentioned structure, if the lock removing knob 236A is moved in the right direction in FIG. 14 to thereby move the slide member 236B in the direction of a shown arrow against the energizing force of the spring 236C, then one end of the lever 236D is pushed by the slide member 236B to thereby rotate the lever 236D in the clockwise direction, with the result that the other end of the lever 236D pushes up the claw portion 236E against the energizing force of the spring 236F. Due to this, the engagement between the claw portion 236E and the saw-tooth-like portion 242B is removed to thereby release the locking of the grip main body 240, so that the grip main body 240 can be rotated.

And, after the grip main body 240 is rotated to a desired angle, if the finger is taken off from the lock removing knob 236A, then the slide member 236B is returned to its original position by the spring 236C and also the claw portion 236E is projected out by the spring 236F and is brought into engagement with the saw-tooth-like portion 242B, with the result that the angle of the grip main body 240 can be fixed.

When the claw portion 236E is in engagement with the recessed portion 242 of the grip main body 240, the grip main body 240, as shown in FIG. 14, is set an angle suitable for use of the grip (an angle inclined 30° from the vertical direction toward the front of the camera). Also, when the claw portion 236E is in engagement with the saw-tooth-like portion 242B of the grip main body 240, the grip main body 240, as will be discussed later, is used as part of a tripod, and the camera angle when the tripod is fixed is set in accordance with positions in which the claw portion 236E is in mesh with the saw-tooth-like portion 242B.

On the other hand, the photographing button mechanism 238 comprises a button operation portion 238A, a spring 238B for returning the button operation portion 238A, an actuation member 238C which is fixed to the button operation portion 238A, a lever 238D which can be rotated by the actuation member 238C, a click spring 238E which is used to operate the lever 238D in a click way, and a REC start switch 238F which can be turned on/off by the lever 238D.

In the above-mentioned structure, if the button operation portion 238A is pushed in beyond a predetermined blind zone, then the lever 238D is rotated in a counter-clockwise direction by the actuation member 238C and thus the REC start switch 238F is pressed by the other end of the lever 238 to thereby turn on. By the way, the REC start switch 238F is electrically connected through a connector (not shown) with the camera main body.

On the other hand, if the finger is taken off from the button operation portion 238A, then the button operation portion 238A and actuation spring 238B are returned to their respective original positions by the spring 238B, with the result that the lever 238D is rotated in a clockwise direction to thereby turn off the REC start switch 238F.

Figure 15:
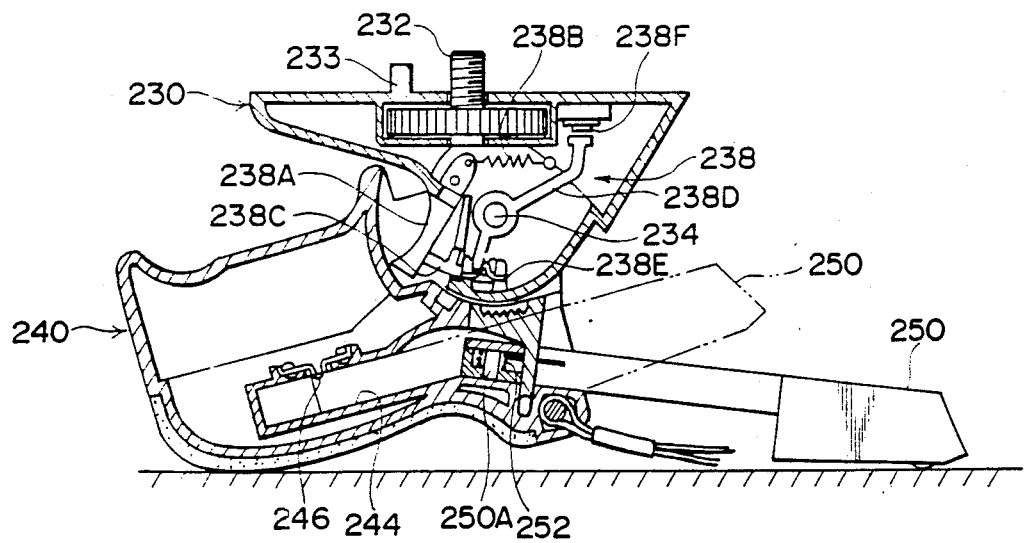
FIG. 15 is a side section view of the tripod containing grip shown in FIG. 12, when it is used.

Now, as described before, the grip main body 240 is arranged such that it can be freely rotated through the support shaft 234 with respect to the grip base portion 230, and also, as shown in FIG. 15, has a storage portion 244 which can store parts of a pair of right and left leg portions 250, 250 in a slidable way. Here, numeral 246 designates a spring which is used to fix the leg portions 250, 250 stored in the storage portion 244.

Figure 16:
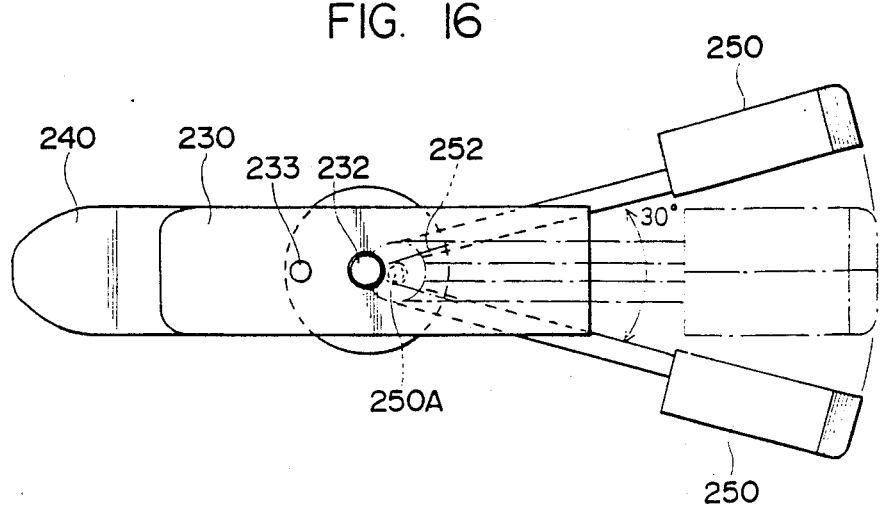
FIG. 16 is a plan view of the above tripod containing grip, when it is used.

On the other hand, the leg portions 250, 250, as shown in FIG. 15, are arranged such that they are free to slide between a position shown by a solid line in which they are pulled out from the rear portion of the grip main body 240 and a position shown by a two-dot chained line in which they are stored in part within the storage portion 244 of the grip main body 240. Also, the pair of right and left leg portions 250, 250 are supported by a shaft 250A rotatably with respect to each other and between the two leg portions there is interposed a return spring 252 which is used to energize the leg portions 250, 250 in the opening directions thereof (see FIG. 16). Therefore, if the leg portions 250, 250 are pulled out a given amount from the rear portion of the grip main body 240, then, as shown in FIG. 16, the paired right and left leg portions 250, 250 are opened right and left symmetrically by the return spring 252. Here, the angle of opening of the pair of right and left leg portions is 30°.

In other words, according to the tripod containing grip constructed in the above-mentioned manner, when the tripod containing grip is changed from the state thereof in which the grip can be used as a hand grip to the state thereof in which the grip can be used as a tripod, as shown in FIGS. 12 and 13, at first, the grip main body 240 is inclined toward the front portion of the video camera and after then the pair of right and left leg portions 250, 250 are pulled out from behind the grip main body 240. The two legs 250, 250 pulled out are then opened right and left symmetrically by a given angle by the return spring 252. In this manner, the camera can be supported at three points, that is, at the grip main body 240, and the pair of right and left leg portions 250, 250.

Figure 17:
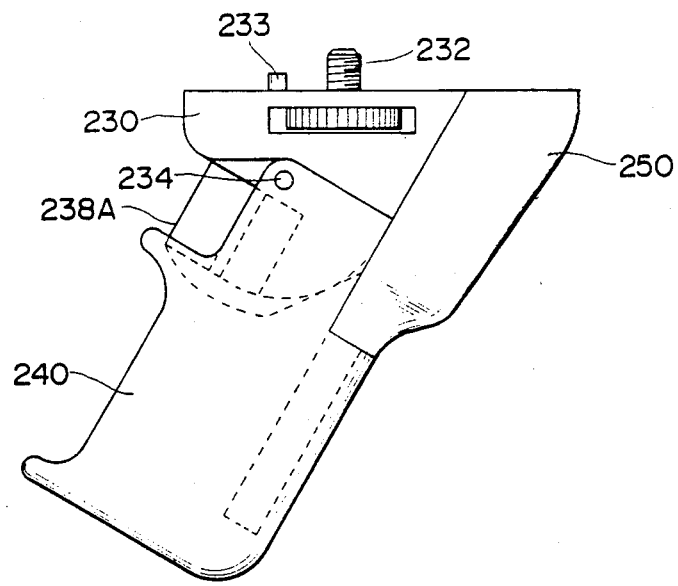
FIG. 17 is a side view of another embodiment of a tripod containing grip according to the invention, when the grip is used.
Figure 18:
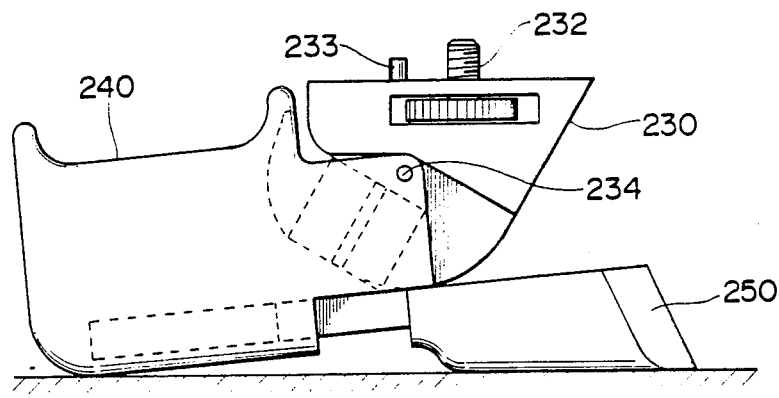
FIG. 18 is a side view of the above embodiment in FIG. 17, when the tripod is used.
Figure 19:
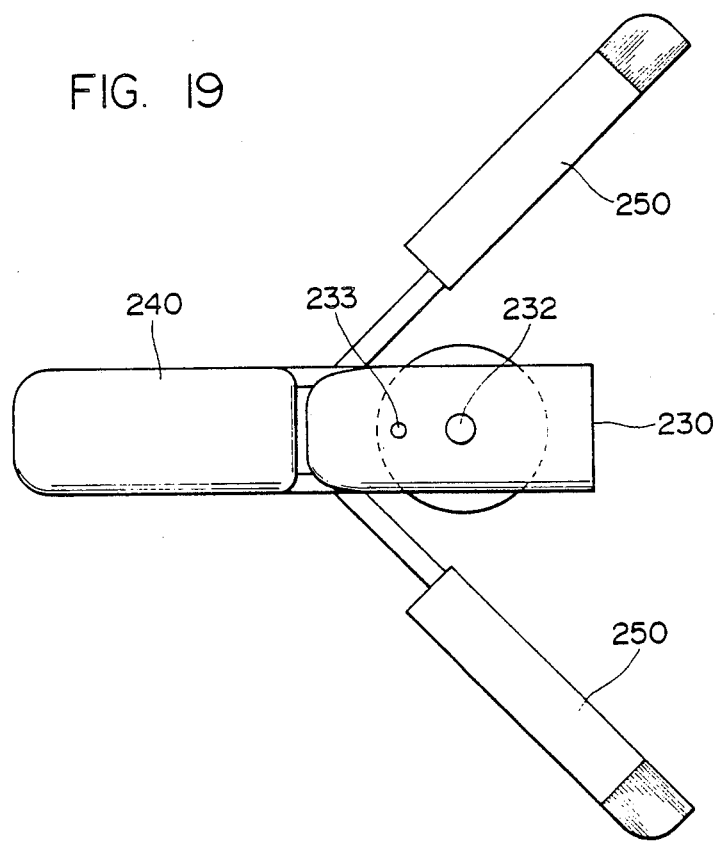
FIG. 19 is a plan view of the above embodiment in FIG. 17, when the tripod is used; and, FIG. 20 is a section view of the structure of a mount portion in which a tripod containing grip can be mounted in an arbitrary direction.

Referring now to FIGS. 17 to 19, there is shown another embodiment of a tripod containing grip according to the invention. In particular, in FIG. 17, there is shown a side view of the tripod containing grip when it is used as a grip, and in FIGS. 18 and 19, there are shown a side view and a plan view of the tripod containing grip when it is used as a tripod.

Here, since this tripod containing grip is different from the before-described tripod containing grip only in shape, the parts thereof respectively having the same mechanisms with the former embodiment are given the same designations, and the detailed description thereof is omitted here.

This tripod containing grip is different from the previously-mentioned tripod containing grip mainly in that, as shown in FIG. 17, part of the leg portion 250 forms a portion of the grip, and that, as shown in FIG. 19, when pulling out the pair of right and left leg portions 250, 250, they are pulled out as facing upward without changing the angle thereof into downward on the way.

Here, although the tripod containing grip according to this embodiment can be removably mounted to the bottom portion of the video camera, the invention is not always limited to this, but, alternatively, the tripod containing grip may be fixed integrally to the bottom portion of the video camera. Also, the angular lock mechanism and photographing button mechanism are not always limited to this embodiment, but other various kinds of such mechanisms may also be employed.

Now, when the above-mentioned tripod containing grip 200 is used as a tripod, it may be mounted to the bottom portion of the video camera main body 10 with the front and rear portions thereof being reversed or in an arbitray direction in order that it can be stabilized as a tripod. On the other hand, if the positioning pin 233 for preventing the rotational movement is omitted, when the tripod containing grip is used as an under grip, there is the possibility that the video camera may be rotated and thus it may be unstable.

Therefore, the rotation preventive positioning pin may be conveniently arranged such that it is free to appear and retreat. That is, when the positioning pin is situated at the other positions of the video camera bottom portion than the recessed portion thereof, the positioning pin can be retreated so that the tripod containing grip can be mounted to the video camera main body in an arbitrary direction with respect to the camera main body.

Figure 20:
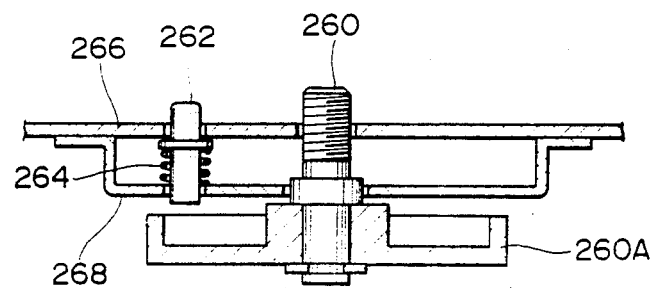

In FIG. 20, there is shown a section view of the structure of a mounting portion which makes it possible for the tripod containing grip to be mounted to the bottom portion of the video camera main body in an arbitrary direction. The mounting portion is mainly composed of a tripod screw 260, a positioning pin 262 and a coil spring 264.

The tripod screw 260 has a disc-shaped knob 260A fixed thereto and, by rotating the knob 260A, the tripod screw 260 can be rotated. Also, the positioning pin 262 is interposed between a plate 266 to be abutted against the bottom portion of the video camera main body and another plate 268 located below the plate 266 in such a manner that it can be moved freely in a vertical direction in FIG. 20, and at the same time the positioning pin 262 is energized by the coil spring 264 in a direction (in an upward direction in FIG. 20) in which the pin is projected.

When the tripod containing grip is mounted as an under grip to the bottom portion of the video camera main body by means of the above-mentioned mounting portion, the tripod screw 260 is situated at the tripod-mounting tapped hole formed in the bottom portion of the video camera main body, the positioning pin 262 is inserted into the recessed portion formed in the video camera main body bottom portion for prevention of the rotational movement, and the tripod screw 260 is turned using the knob 260A thereof to thereby bring it into threaded engagement with the tripod-mounting tapped screw.

On the other hand, when the tripod containing grip is mounted as a tripod to the bottom portion of the video camera main body, the mounting of the grip is not always limited to the above-mentioned mounting way in which, as described above, the positioning pin 262 is inserted into the rotation preventive recessed portion, but other mounting ways may also be employed. For example, the tripod containing grip can be mounted with the front and rear portions being reversed, or in an arbitray direction. Preferably, the tripod containing grip is mounted in a direction in which it can be best stabilized as a tripod. In this case, the positioning pin 262 is abutted against the bottom portion of the video camera main body and is caused to retreat against the energizing force of the coil spring 264, and the video camera is fixed to the tripod containing grip only by the tripod screw 260.

According to the tripod containing grip constructed in the above-mentioned manner, when it is used as a grip, due to the fact that the pair of right and left leg portions are slidably stored within the grip main body, there is provided an advantage that the grip is easy to hold with no or little possibility of the leg portions being touched by the hands. Also, when used as a tripod, since the grip main body is inclined toward the front portion of the video camera and the pair of right and left leg portions are drawn out from the rear portion of the grip main body and are then opened to a predetermined angle, the center of gravity of the video camera can be lowered and also the three points thereof to touch the ground can be great in distance, so that a highly stable tripod can be supplied.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A video camera comprising:
   a first photographing button disposed in a main body of said video camera for instructing alternately the start and stop of photographing each time said button is operated;
   an under grip mountable removably to the bottom portion of said video camera main body;
   a second photographing button disposed in said under grip for instructing the start of photographing only when said button is operated; and,
   means, responsive to the mounting of said under grip to said video camera main body or to the electrical connection between said under grip and video camera main body, for prohibiting the start of photographing by said first photographing button.

2. A video camera as set forth in claim 1, wherein said photographing start prohibiting means comprises detection means for detecting the electrical connection between said under grip and video camera main body and preventive means responsive to the detection output of said detection means for preventing the output of said first photographing button.

3. A video camera as set forth in claim 1, wherein said photographing prohibiting means comprises a grip mounting detection switch disposed in the bottom portion of said video camera main body for preventing the output of said first photographing button when it is operated, and a switch actuation member disposed in said under grip for actuating said grip mounting detection switch in connection with the mounting of said under grip to said video camera main body.

4. A video camera as set forth in claim 1, wherein said photographing start prohibiting means comprises a lock member disposed in said under grip and engageable with said first photographing button when said under grip is mounted to said video camera main body to thereby mechanically prevent the button operation of said first photographing button.

5. A video camera as set forth in claim 1, wherein said second photographing button is adapted such that, after photographing is started by the button operation of said second photographing button, the photographing start instruction can be maintained with a weaker button operation force than the button operation force at the time of start of photographing.

6. A video camera as set forth in claim 1 or 5, wherein said under grip comprises a grip main body which can be rotatably mounted to the bottom portion of said video camera main body and the angle of which can be fixed at a first angle when said grip main body is used a grip or at an angle further inclined toward the front portion of said video camera than said first angle when said grip main body is used as a tripod, and a pair of right and left leg portions at least parts of which can be slidably stored within said grip main body in the longitudinal direction of said grip main body, and which can be pulled out from the rear portion of said grip main body when said grip main body is used as tripod, and can be opened to a predetermined angle.

7. In a video camera including a photographing button for instructing the start of photographing only when said photographing button is operated, the improvement comprising that, after the photographing is once started by the button operation of said photographing button, the photographing start instruction can be maintained with a weaker button operation force than the button operation force at the time of start of the photographing.

8. A video camera as set forth in claim 7, wherein said photographing button comprises a button operation portion, spring means for returning said button operation portion to its original position, first and second switches respectively adapted to turn on at first and second positions of said button operation portion, and means, when photographing is being stopped, for instructing the start of photographing when both of said first and second switches turn on, and, when photographing is being performed, for instructing the stop of the photographing when both of said first and second switches turn off.

9. A video camera as set forth in claim 7, wherein said photographing button comprises a button operation portion, spring means for returning said button operation to its original position, a switch adapted to turn on when said button operation portion is situated at a predetermined stroke position to thereby instruct the start of photographing, and damper means operable when said button operation portion is moved to said predetermined stroke position.

10. A video camera as set forth in claim 7, wherein said photographing button is disposed in an under grip mounted to the bottom portion of a main body of said video camera.

* * * * *